(12) United States Patent
Yoon et al.

(10) Patent No.: US 12,521,954 B2
(45) Date of Patent: Jan. 13, 2026

(54) ROLL PRESSING DEVICE

(71) Applicant: SAMSUNG SDI CO., LTD., Yongin-si (KR)

(72) Inventors: Sungho Yoon, Yongin-si (KR); Jaesoon Jang, Yongin-si (KR); Jun-Ho Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/810,784

(22) Filed: Aug. 21, 2024

(65) Prior Publication Data

US 2025/0170795 A1    May 29, 2025

(30) Foreign Application Priority Data

Nov. 24, 2023  (KR) .......................... 10-2023-0166064

(51) Int. Cl.
  *B30B 3/00*    (2006.01)
  *B30B 15/34*   (2006.01)

(52) U.S. Cl.
  CPC .............. *B30B 3/005* (2013.01); *B30B 15/34* (2013.01)

(58) Field of Classification Search
  CPC ................................. F28F 5/02; D21G 1/0266
  See application file for complete search history.

(56) References Cited

U.S. PATENT DOCUMENTS

| | | | | |
|---|---|---|---|---|
| 4,658,486 A * | 4/1987 | Schonemann | ....... | D21G 1/0266 492/46 |
| 4,705,579 A | 11/1987 | Fujii | | |
| 4,964,202 A * | 10/1990 | Pav | ......... | D21G 1/022 100/336 |
| 5,111,564 A * | 5/1992 | Pav | ......... | F16C 13/028 100/329 |
| 5,404,936 A * | 4/1995 | Niskanen | .................. | F28F 5/02 165/146 |
| 6,436,022 B1 * | 8/2002 | Zaoralek | ................. | F16C 13/00 492/46 |

(Continued)

FOREIGN PATENT DOCUMENTS

| | | |
|---|---|---|
| CN | 213791524 U | 7/2021 |
| CN | 219817473 U | 10/2023 |
| IT | FI20040245 A1 * | 11/2004 |

(Continued)

OTHER PUBLICATIONS

Translation of IT_FI20040245_A1 (Year: 2004).*

(Continued)

*Primary Examiner* — Jacob J Cigna
(74) *Attorney, Agent, or Firm* — Venable LLP

(57) ABSTRACT

A roll pressing device may include a roller configured to pressurize a substrate provided with an active material, and provided with a pair of cooling lines through which a coolant circulates, respectively, a shaft supported by a bearing and configured to drive the roller, a pair of supply lines provided on both sides of the shaft and configured to supply the coolant to the pair of cooling lines, respectively, and a pair of discharge lines provided on the both sides of the shaft and configured to discharge the coolant having cooled the roller from the pair of cooling lines, respectively, where the pair of cooling lines are separated from each other.

9 Claims, 24 Drawing Sheets

(56) References Cited

U.S. PATENT DOCUMENTS 6,683,284 B2 * 1/2004 Nyman ............... D21F 5/022
492/46
2004/0071812 A1 * 4/2004 Tsuji .................. B29C 43/52
165/47

FOREIGN PATENT DOCUMENTS

| JP | H0247387 A | * | 8/1988 |
| JP | 2005-288535 A | | 10/2005 |
| JP | 2011-181348 A | | 9/2011 |
| JP | 2012-200728 A | | 10/2012 |
| JP | 2015157294 A | * | 9/2015 |
| JP | 5797322 B1 | * | 10/2015 |
| JP | 2024151008 A | * | 10/2024 |
| KR | 100737817 B1 | * | 7/2006 |

OTHER PUBLICATIONS

Translation of JP_2015157294_A (Year: 2015).*
Translation of JP_2024151008_A (Year: 2024).*
Translation of JP_5797322_B1 (Year: 2014).*
Translation of JP_H0247387_A (Year: 1988).*
Translation of KR_100737817_B1 (Year: 2006).*
Cho et al., Optimizing the Configurations of Cooling Channels with Low Flow Resistance and Thermal Resistance, Transactions of the Korean Society of Mechanical Engineers B, 35(1), 9-15 (2011) (with English translation).
Mar. 27, 2025 Extended European Search Report in counterpart European Patent Application No. 24 21 1739.8.

\* cited by examiner

L1=25mm

510(3541, 351, 3561)
520(3542, 352, 3562)

ROLL PRESSING DEVICE

CROSS-REFERENCE TO RELATED APPLICATION

This application claims priority to and the benefit of Korean Patent Application No. 10-2023-0166064 filed in the Korean Intellectual Property Office on Nov. 24, 2023, the entire contents of which is incorporated herein by reference.

BACKGROUND

(a) Field

The present disclosure relates to a roll pressing device.

(b) Description of the Related Art

A press process is used to manufacture the negative electrode and positive electrode of lithium-ion rechargeable batteries. In such a process, pressure is applied to a positive active material coated on aluminum substrate (e.g., Al Foil) and a negative active material coated on copper substrate (e.g., Cu Foil) such that the capacity density of the active material with respect to the electrode plate may be increased, and the binding force between the active material and the substrate may be increased. A roll pressing device is an example of a device that can be used in such a process.

A roll pressing device has a structure in which a substrate coated with an active material, which is transported roll-to-roll, passes between rollers driven by bearings and a rotation motor. The substrate coated with the active material is spread out flat due to the tension acting on both ends of the substrate, and as it passes between the rollers, it is compressed to have a thickness equal to the distance between the rollers.

The location where the flat substrate and the circular roller meet is a line, so a linear pressure is applied to the substrate. As a result, a maximum linear pressure can be applied to the substrate and active material with a minimal load. Accordingly, the active materials to which the linear pressure is applied are compressed, thereby increasing the capacity density of the active material with respect to the substrate.

The volume of the roller may expand due to the frictional heat generated between a roller shaft and a bearing and the frictional heat generated between the roller surface and the surface of the substrate. When the roller expands, the gap between the rollers decreases, causing the process to deviate from the designed process conditions.

SUMMARY

The present disclosure provides a roll pressing device capable of preventing non-uniform expansion of a roller due to thermal gradients by dissipating the frictional heat between a roller, a bearing, and an electrode substrate during the roll pressing of an electrode substrate.

A roll pressing device may include a roller configured to apply pressure to a substrate provided with an active material, and may be provided with a pair of cooling lines through which a passes, with a shaft configured to drive the roller, with a pair of supply lines provided on opposite sides of the shaft and configured to supply the coolant to the pair of cooling lines, and with a pair of discharge lines provided on the opposite sides of the shaft and configured to discharge the that has cooled the roller from the pair of cooling lines, The pair of cooling lines are separated from each other. And the pair of cooling lines may be separated to both sides of a center of the roller in a length direction of the roller.

Each of the pair of cooling lines may include a plurality of diffusion passages connected to one of supply lines at an outer end of the roller, each of the diffusion passages radially extending from the supply line toward a surface of the roller, a plurality of cooling passages connected to the plurality of diffusion passages at a roller surface side, and each of the cooling passages extending toward the center of the roller in the length direction, and a plurality of convergence passages connected to the plurality of cooling passages at a center of the roller in the length direction side, each of the convergence passages radially extending toward a center of the roller in a radial direction and connected to one of the discharge lines.

The plurality of diffusion passages may have a slope at an angle θ relative to a radius of the roller that is perpendicular to the length direction.

The plurality of cooling passages may be spaced apart from each other to have a pitch along a circumferential direction of the roller, and each of the cooling passages has a separation distance from a surface of the roller in the radial direction.

The discharge line may be configured to be, in the roller, spaced apart from the center of the roller in the radial direction toward an outer side of the roller, connected to the convergence passage, and extending to pass between the plurality of diffusion passages, and Each of the discharge lines may be configured to be, in the shaft, spaced apart from an outer side of the supply line in the radial direction and extending along a length direction of the shaft.

Each of the cooling lines may include a diameter of 5 mm to 10 mm.

The number of the plurality of diffusion passages may be 6 to 16.

A distance between the cooling passage and a surface of the roller may be 25 to 75 mm.

The plurality of diffusion passages may extend from the center of the roller in the radial direction to an outer part of the roller.

Each of the discharge lines may include a bent portion split into plural parts at the center of the roller in the radial direction, and the bent portion extends around a connection portion between one of the supply lines and diffusion passages of the plurality of diffusion passages.

The pair of cooling lines may include a first cooling line and a second cooling line alternately disposed along a circumferential direction of the roller.

The first cooling line may include a plurality of first diffusion passages connected to a first supply line at a first outer end of the roller, the plurality of first diffusion passages extending in a radial direction of the roller from the first supply line toward the a surface of the roller, a plurality of first cooling passages connected to the plurality of first diffusion passages at a surface side of the roller, and the plurality of first cooling passages extending to a second outer end of the roller, and a plurality of first convergence passages connected to the plurality of first cooling passages at the second outer end of the roller, the plurality of first convergence passages extending toward a center of the roller in the radial direction and connected to a first discharge line of the plurality of discharge lines, and The second cooling line may include a plurality of second diffusion passages connected to a second supply line of the plurality of supply lines at the second outer end of the roller, the plurality of second diffusion passages extending in the radial direction toward the surface of the roller, a plurality of second cooling passages connected to the plurality of second diffusion passages at the surface side, the plurality of second cooling passages extending to the first outer end of the roller, and a plurality of second convergence passages connected to the plurality of second cooling passages at the first outer end of the roller, the plurality of second convergence passages extending toward the center of the roller in the radial direction and connected to a second discharge line of the plurality of discharged lines.

The first discharge line may be formed in the shaft as a bent portion that detours around a second connection portion of second convergence passages, and the second discharge line may be formed in the shaft as a bent portion that detours around a first connection portion of the first convergence passages.

According to an embodiment, a pair of cooling lines are separately formed from the roller, thereby preventing non-uniform expansion of the roller due to thermal gradients. Thus, the capacity density of electrode substrate may be uniformly distributed.

DETAILED DESCRIPTION OF THE EMBODIMENTS

Figure 1:
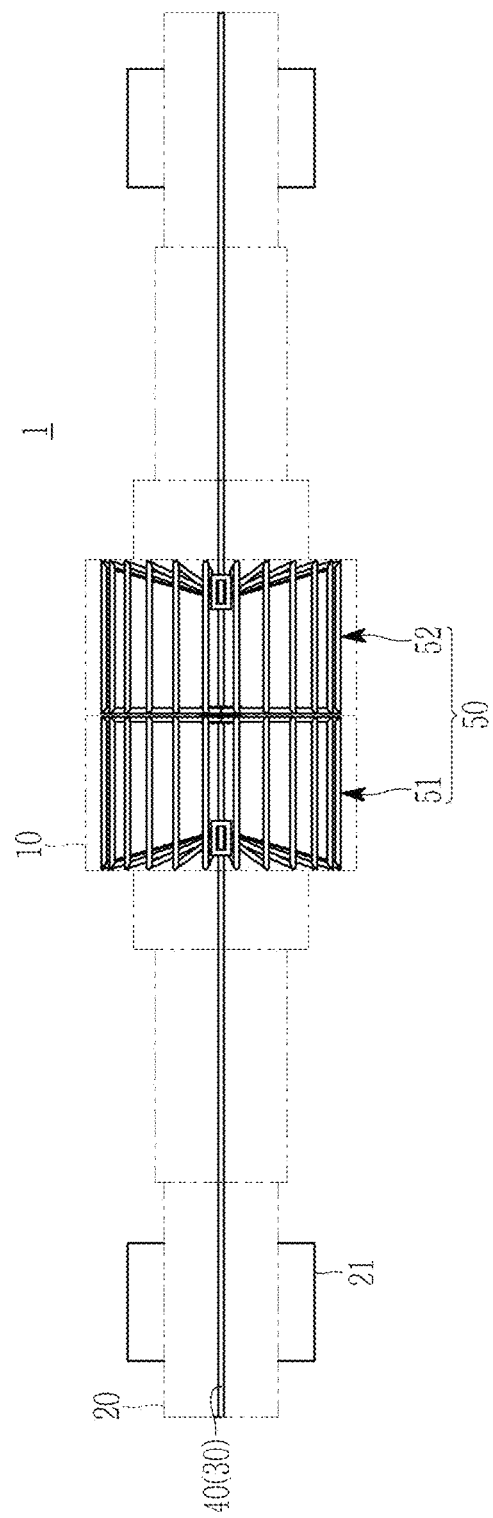
FIG. 1 is a drawing showing a roller and a shaft, and an arrangement of a cooling line, a supply line, and a discharge line formed therein of a roll pressing device for an electrode substrate according to a first embodiment of the present disclosure.

The present disclosure will be described more fully hereinafter with reference to the accompanying drawings, in which embodiments of the invention are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

A roll pressing device has a structure in which a substrate coated with an active material, which is transported roll-to-roll, passes between rollers driven by bearings and a rotation motor. However, the volume of the roller may expand due to the frictional heat generated between the roller shaft and the bearing and the frictional heat generated between the roller surface and the surface of the substrate. When the roller expands, the gap between the rollers decreases, causing the process to deviate from the designed process conditions. In order to prevent the roller from expanding in volume, according to embodiments of this disclosure a coolant is circulated into the roller such that temperature increase of the roller surface may be suppressed.

Due to thermal gradients from the center of the substrate to the outside, a difference may occur in thermal expansion amount of the roller, a difference may occur across the entire length of the gap between the rollers due to the difference of thermal expansion amount of the roller, a difference in the compressed thickness of the active material may occur due to the difference of the roller gap, and a capacity density may become non-uniform in the substrate due to the thickness difference of the active material. Accordingly, the uniform expansion of the roller diameter needs to be secured by uniformly controlling the temperature of the roller.

Figure 2:
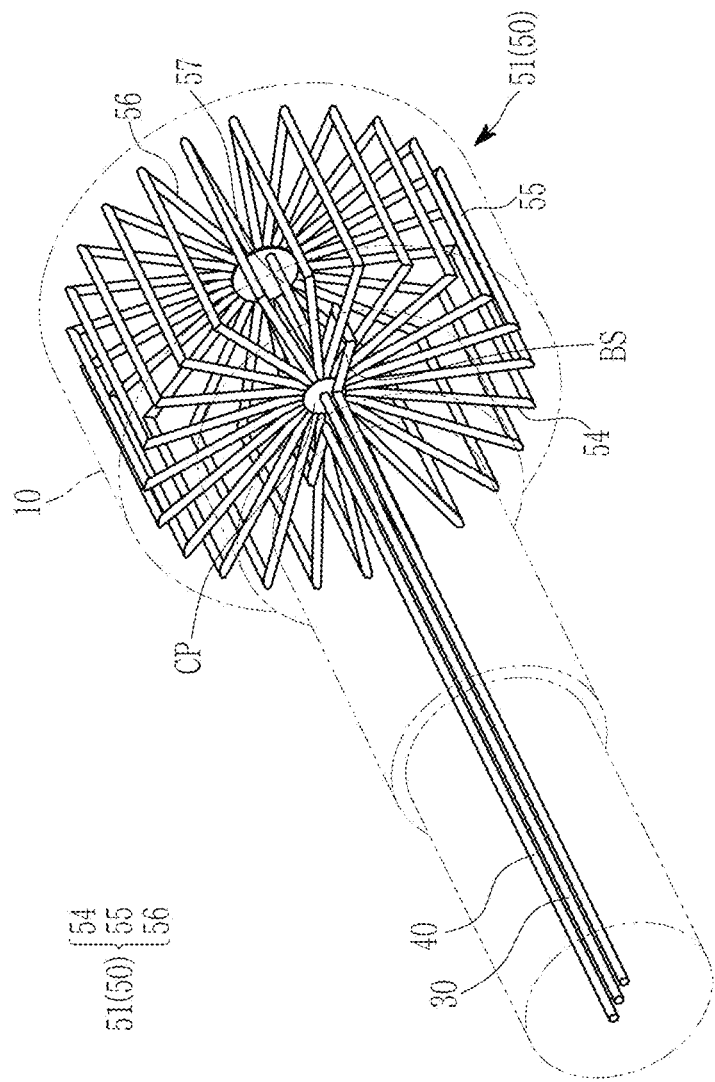
FIG. 2 is a perspective view showing a cooling line, a supply line and a discharge line of FIG. 1 provided in a roller and a shaft.
Figure 3:
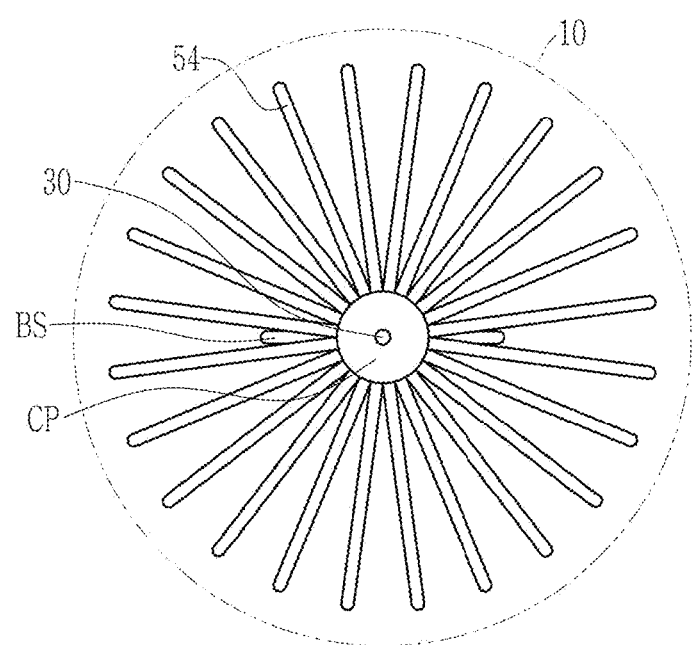
FIG. 3 is a side view showing the supply line of FIG. 2.
Figure 4:
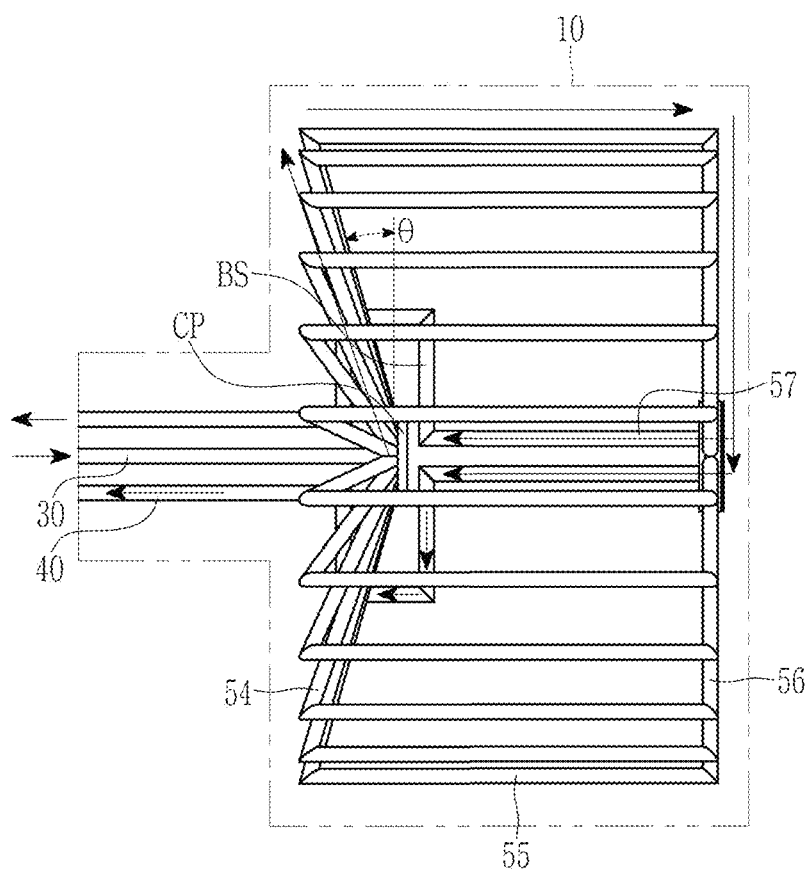
FIG. 4 is a front view showing the supply line of FIG. 2.

FIG. 1 is a drawing showing the roller and a shaft, and an arrangement of a cooling line, a supply line, and a discharge line formed therein of a roll pressing device for an electrode substrate according to a first embodiment of the present disclosure. FIG. 2 is a perspective view showing a cooling line, a supply line and a discharge line of FIG. 1 provided in the roller and a shaft. FIG. 3 is a side view showing the supply line of FIG. 2. FIG. 4 is a front view showing the supply line of FIG. 2.

Referring to FIG. 1 to FIG. 4, a roll pressing device 1 for an electrode substrate of a first embodiment is configured such that the electrode substrate on which the active material is coated may be pressurized in a roll-to-roll method. For convenience, one roller 10 and a shaft 20 configured to drive the roller 10 constituting a roll pressing device are shown.

A roll pressing device for an electrode substrate 1 includes the roller 10, the shaft 20, a pair of supply lines 30 respectively supplying a coolant at both sides of the shaft 20 in a length direction, and a pair of discharge lines 40 respectively discharging a high-temperature coolant at both sides of the shaft 20 in the length direction. As an example, the coolant may include water. For convenience, hereinafter, it is described as the coolant. The roller 10 is provided with of cooling lines 50 through which the coolant circulates. The shaft 20 to drive the roller 10 may be supported by the bearing 21.

The supply lines 30 may be provided on the both sides of the shaft 20 in the length direction, and supply the low-temperature coolant to the cooling lines 50. The discharge lines 40 may be provided on the both sides of the shaft 20 in the length direction, and discharge from the cooling lines 50 a higher temperature the coolant that has cooled the roller 10.

The cooling lines 50 are separated from each other, and may independently cool the roller 10 by heat-exchanging with the roller 10. In a first embodiment, the cooling lines 50 may be separate from each other and provided on both sides of a center of the roller 10 in the length direction. The cooling lines 50 include a first cooling line 51 and a second cooling line 52. The first cooling line 51 may cool the roller 10 on a first side (e.g., left side in FIG. 1) of the roller 10 in the length direction, and the second cooling line 52 may cool the roller 10 on a second side (e.g., right side in FIG. 1) of the roller 10 in the length direction. Thus, the circulation path of the coolant may be shortened, and temperature increase due to circulation of the coolant that has warmed following cooling of the roller 10 may be prevented. That is, since the low-temperature coolant circulates to cool the roller 10 and then is immediately discharged, the cooling efficiency of the roller 10 may be increased.

The pair of cooling lines 50, i.e., the first and second cooling lines 51 and 52, may be configured to cool the first side of the roller 10 in a heat-exchanging method. The coolant flows in the cooling line 50 and is supplied to the first side of the roller 10. The coolant is continuously connected to circulate, heat-exchange, and discharge, and cooling line 50 includes a diffusion passage 54, a cooling passage 55, and a convergence passage 56 connected to a supply line 30 and a discharge line 40. A plurality of each of the diffusion passage 54, the cooling passage 55, and the convergence passage 56 may be provided and connected to each other. Hereinafter, a plurality of each is assumed for convenience.

The supply line 30 is formed at a center of the shaft 20 along the length direction of the shaft and introduces the low-temperature coolant.

A plurality of diffusion passages 54 are connected to the supply line 30 in a radial structure at an outer end of the roller 10 and adjacent to a surface of the roller 10.

A plurality of cooling passages 55 is adjacent to the surface of the roller 10 and connected to the diffusion passages 54, with the cooling passages 55 being parallel to each other and formed to positions at the center of the roller 10 in the length direction. The cooling passages 55 are connected to ends of the diffusion passages 54 and are uniformly disposed along a circumferential surface of the roller 10. As such, the surface of the roller 10 may be uniformly cooled.

A plurality of convergence passages 56 may be connected to the cooling passages 55 in a radial structure at the center of the roller 10 in the length direction, with the plurality of convergence passages 56 being formed to be adjacent to a center of the roller 10 in the diameter direction. Here, the center means a center of a circle formed along an exterior surface of the roller 10.

The discharge line 40 is connected to the convergence passages 56, formed along the center of the roller 10 in the radial direction, and formed on an outer side of the supply line 30, in the shaft 20. The discharge line 40 is formed split into a plurality of lines (e.g., two) around the center of the roller 10 in the radial direction, formed on the shaft 20 as a bent portion BS, and connected to the convergence passages 56 (see FIG. 6).

During roll pressing, the coolant circulating in the cooling passages 55 of the roller 10 discharges, through heat-exchange, the heat generated between the roller 10 and the bearing 21 and heat generated by the friction between the roller 10 and the electrode substrate. Thus, the roller 10 may be prevented from non-uniformly expanding due to thermal gradients, thereby preventing the formation of non-uniform capacity density in the electrode substrate. The cooling passages 55 can be seen to have a cooling passage structure that resembles capillaries.

The frictional heat generated on the surface of the roller 10 may be absorbed into the coolant circulating the cooling passages 55. To this end, the cooling passages 55 are responsible for heat-dissipation, and in a radial direction of the roller 10, a distance between an outer surface of the roller 10 and the cooling passage 55 is much shorter than a length of the radius of the roller 10. The coolant may flow into the cooling passages 55 via the supply line 30 and the diffusion passages 54. The frictional heat absorbed in the coolant circulating the cooling passages 55 is discharged to outside via the convergence passages 56 and the discharge line 40.

Accordingly, the heat generated on the surface of the roller 10 is dissipated through the medium of the coolant, and the surface temperature of the roller 10 may be decreased. That is, the coolant running through the cooling line 50, the supply line 30, the diffusion passage 54, the cooling passages 55, the convergence passages 56, and the discharge line 40 may efficiently control the temperature of the roller 10, and may suppress thermal gradients of the roller 10.

Due to the diffusion passage 54 in which the fluid line radially expands from the supply line 30, the portion of the surface of the roller 10 that is heated before the coolant substantially absorbs the heat is minimized. That is, a large portion of the roller 10 can substantially absorb heat such that the cooling efficiency of the roller 10 is increased. Also, due to the radially symmetric structure of the diffusion passage 54, thermal gradients in the roller 10 may be suppressed. Accordingly, differences in expansion of the roller 10 due to thermal gradients may be minimized.

The low-temperature coolant is introduced along the center of the roller 10 in the radial direction through the supply line 30 While flowing through the cooling passages 55 connected to the radial diffusion passages 54, which are split into 24 passages along a circumferential direction, the coolant is provided adjacent to the outer surface of the roller 10.

The coolant heat-exchanges with the high heat at the surface of the roller 10, and, thus, the temperature of the coolant increases. The high-temperature coolant gathers from an outer boundary of the roller 10 in the radial direction to a central portion through the convergence passages 56 at the center of the roller 10 in the length direction, and the high-temperature coolant is discharged through two discharge lines 40 provided outside side of the supply line 30 in the radial direction.

One cycle of dissipating the heat is conducted as the coolant is introduced into the supply line 30, passes through the diffusion passage 54, passes through the cooling passage 55, and passes through the convergence passages 56, and is discharged to the discharge line 40. Until the coolant is discharged, the surface of the roller 10 is cooled one time per one cycle to dissipate the heat. Therefore, the coolant may maintain constant heat dissipation performance.

Figure 5:
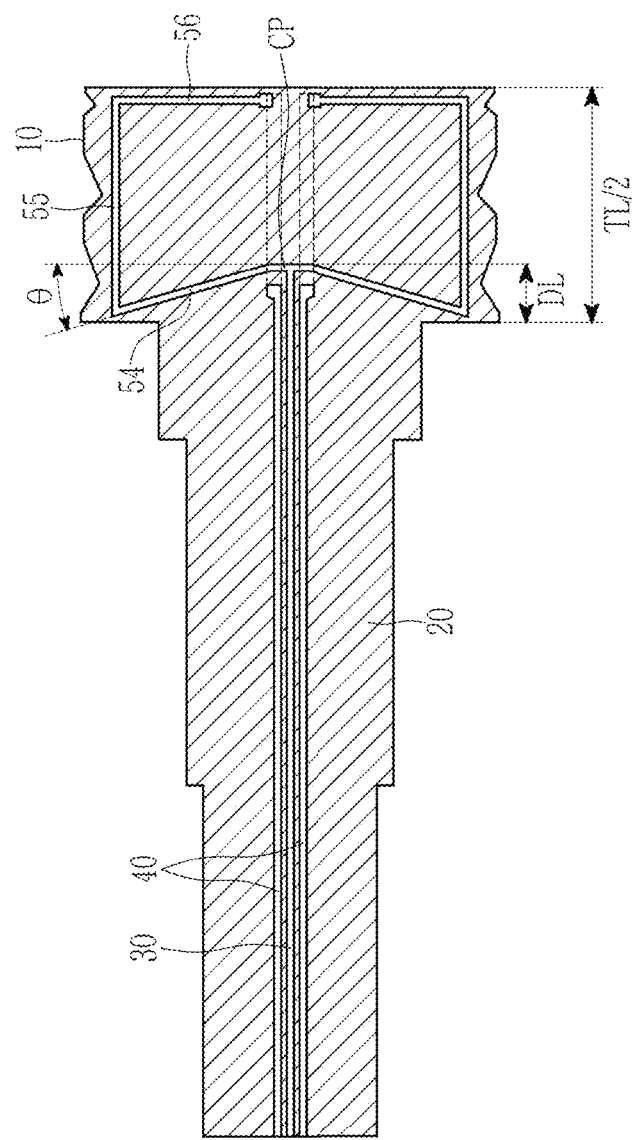
FIG. 5 is a cross-sectional view of a roller and a shaft for showing the cooling line and the supply line of FIG. 1.
Figure 6:
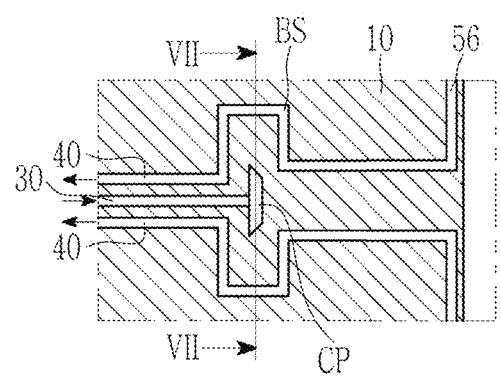
FIG. 6 is a cross-sectional view of a roller and a shaft for showing the convergence passage and discharge line of FIG. 1.
Figure 7:
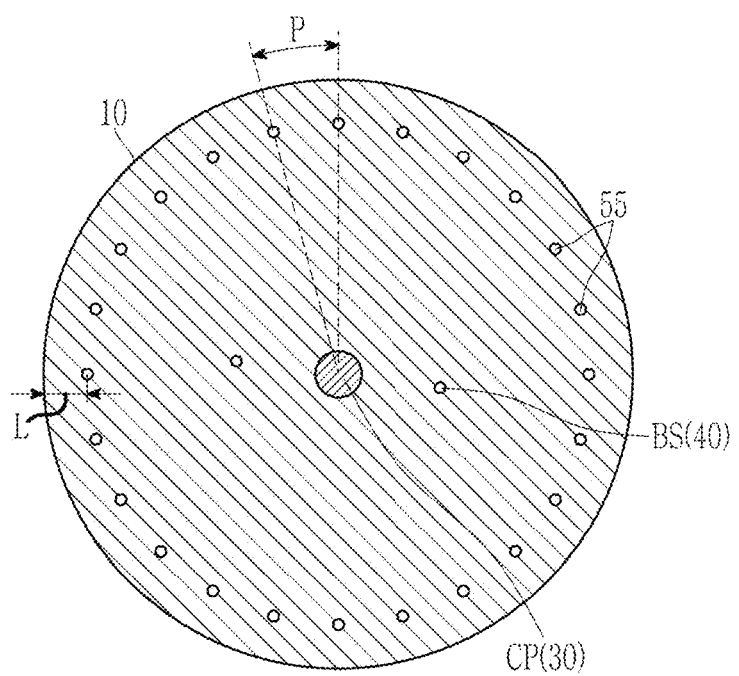
FIG. 7 is a cross-sectional view along line VII-VII of FIG. 6.

FIG. 5 is a cross-sectional view of the roller and a shaft for showing the first cooling line and supply line of FIG. 1. FIG. 6 is a cross-sectional view of the roller and a shaft for showing the convergence passage and discharge line of FIG. 1. FIG. 7 is a cross-sectional view along line VII-VII of FIG. 6.

Referring to FIG. 1 to FIG. 7, the diffusion passages 54 may have a slope at an angle θ relative to a radius of the roller 10 that is perpendicular to the length direction. Since the diffusion passages 54 have the slope at the angle θ, in the shaft 20, a portion of the frictional heat from the bearing 21 and the shaft 20 is transferred to a side surface of the roller 10 but may not heat the coolant. Accordingly, since the diffusion passages 54 transfer the coolant to the outer part of the roller 10 in a sufficiently low temperature state, heat dissipation is enabled even in a portion adjacent to the shaft 20, thereby preventing thermal gradients of the roller 10. The angle θ enables the diffusion passages 54 connected to a connection portion CP to be formed on the outer part of the roller 10 despite the bent portion BS.

Since the diffusion passages 54 are connected to the supply line 30 at a center of the roller 10 in the radial direction and disposed in a radial structure, the discharge line 40 is split into plural passages (e.g., two) around the center of the roller 10 in the radial direction, and is formed in the shaft 20 by the bent portion BS to detour around the connection portion CP of the supply line 30 and the diffusion passages 54. The discharge line 40 is formed shifted outward from the center of the roller 10 in the radial direction. The discharge line 40 may be formed to pass between the plurality of diffusion passages 54, and may be formed as two passages on the outer sides of the supply line 30 in the radial direction of the shaft 20.

The cooling passages 55 may have a pitch P along the circumferential direction of the roller 10, and may have a gap distance L to the surface of the roller 10 along the radial direction. As the pitch P becomes smaller, the number of the cooling passages 55 may increase, such that the surface of the roller 10 may be more effectively heat-dissipated. In some cases, due to the insufficient space for connecting the diffusion passages 54 to the connection portion CP, interference may occur between the diffusion passages 54 in the connection portion CP. Therefore, when the diffusion passages 54, the cooling passages 55, and the convergence passages 56 have the same interior diameters, if the diffusion passages 54 may be provided with interior diameters such that there is no interference in the connection portion CP, and the heat dissipation performance of the surface of the roller 10 may be improved as the pitch P becomes smaller. As an example, an interior diameter of the passages may be 5 mm to 10 mm.

In order to provide a space for forming the bent portion BS, the connection portion CP is located inward toward a central portion of the roller 10 from one side of the roller 10 by a distance DL. The distance DL may be set as 5-10% of a total length TL of the roller 10. The diffusion passages 54 may be formed inclined within the distance DL range by the angle θ from the connection portion CP toward an outer side of the roller 10.

When the distance DL is less than 5% of the total length TL of the roller 10, it is difficult to install the bent portion BS of the discharge line 40, and when the distance DL is more than 10% of the total length TL of the roller 10, the cooling path is excessively elongated, thereby deteriorating the heat dissipation at the surface of the roller 10.

Figure 8:
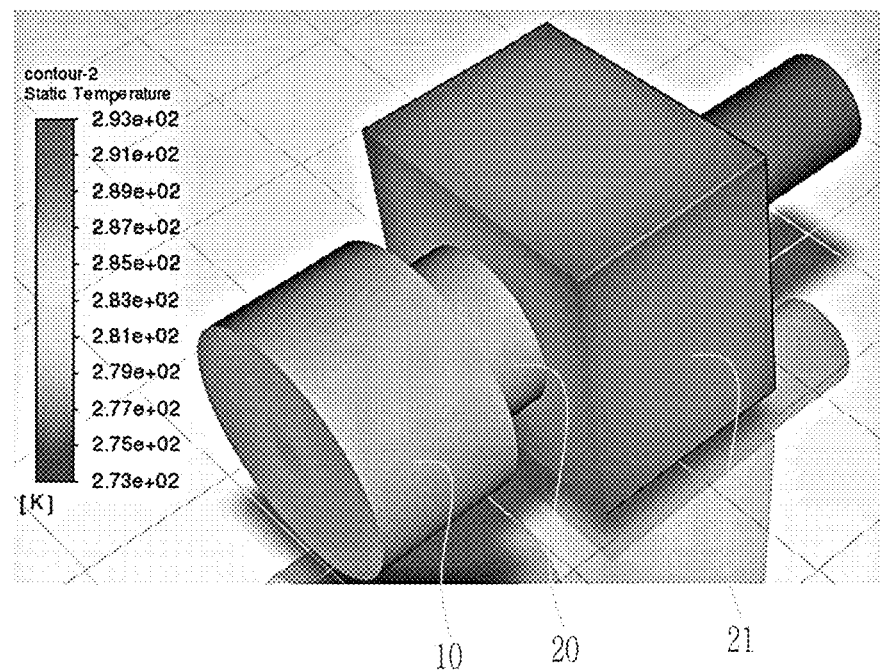
FIG. 8 is an image showing a thermal analysis result when the diameter of the cooling line is 5.0 mm, as a first Experimental Example according to according to a first embodiment.
Figure 9:
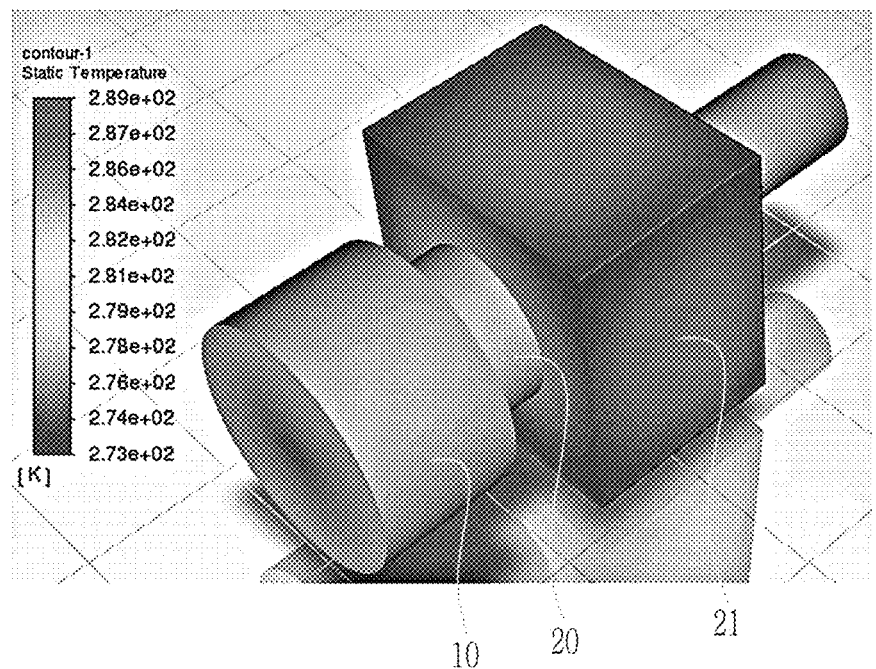
FIG. 9 is an image showing a thermal analysis result when the diameter of the cooling line is 5.0 mm, as a second Experimental Example according to according to a first embodiment.
Figure 10:
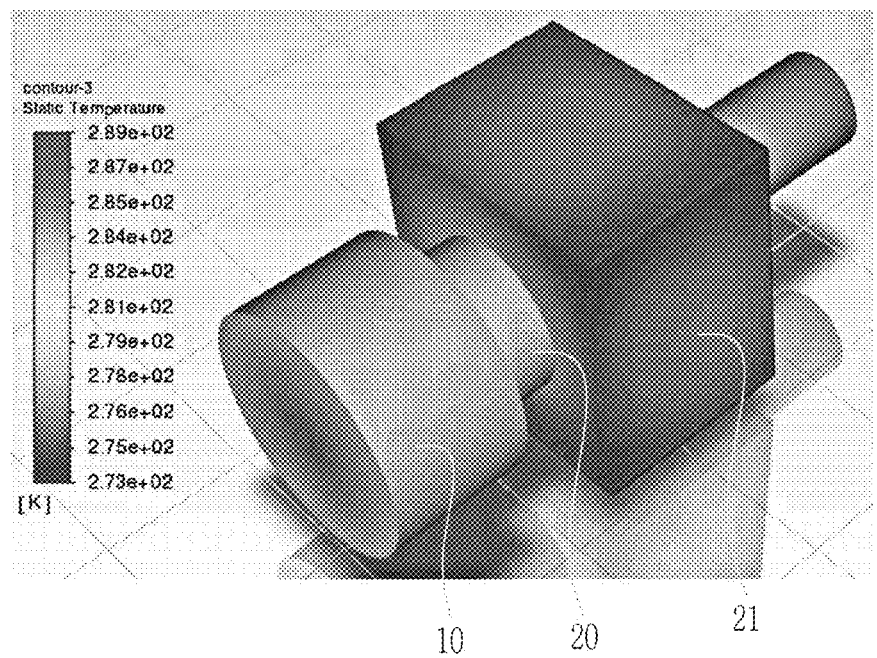
FIG. 10 is an image showing a thermal analysis result when the diameter of the cooling line is 5.0 mm, as a third Experimental Example according to according to a first embodiment.

FIG. 8 is an image showing a thermal analysis result when a diameter φ1 of the cooling line is 5.0 mm, as a first Experimental Example according to according to a first embodiment. FIG. 9 is an image showing a thermal analysis result when a diameter φ2 of the cooling line is 5.0 mm, as a second Experimental Example according to according to a first embodiment. FIG. 10 is an image showing a thermal analysis result when a diameter φ3 of the cooling line is 5.0 mm, as a third Experimental Example according to according to a first embodiment.

Referring to FIG. 8 to FIG. 10, with respect to the interior diameters of the diffusion passages 54, the cooling passages 55, and the convergence passages 56, fluid line thermal analysis was performed by setting the interior diameters in Experimental Example 1 as 5.0 mm, setting the interior diameters in Experimental Example 2 as 10.0 mm, and setting the interior diameters in Experimental Example 3 as 15.0 mm.

Through the thermal analysis, the thermal uniformity of the surface of the roller 10 was confirmed. The coolant was used as a refrigerant, and a pressure of 250,000 Pa was supplied to the cooling line (not shown) of the bearing 21, with the cooling line 50 of the roller 10 being formed separately from the cooling line of the bearing 21. The overall temperature distribution of the roller 10 is shown in the drawings. In the case of Experimental Examples 1 and 2, that is, when the interior diameter of the fluid line is 5.0 mm to 10.0 mm and the pitch P of the fluid line is 85.6 mm, almost no thermal gradient occurred on the surface of the roller 10. Since the cooling passages 55 are positioned on a circle having a diameter of 600 mm, and there are 22 cooling passages 55, the pitch P is calculated as 600*3.14/22. Thus, the pitch P is 85.6 mm.

Figure 11:
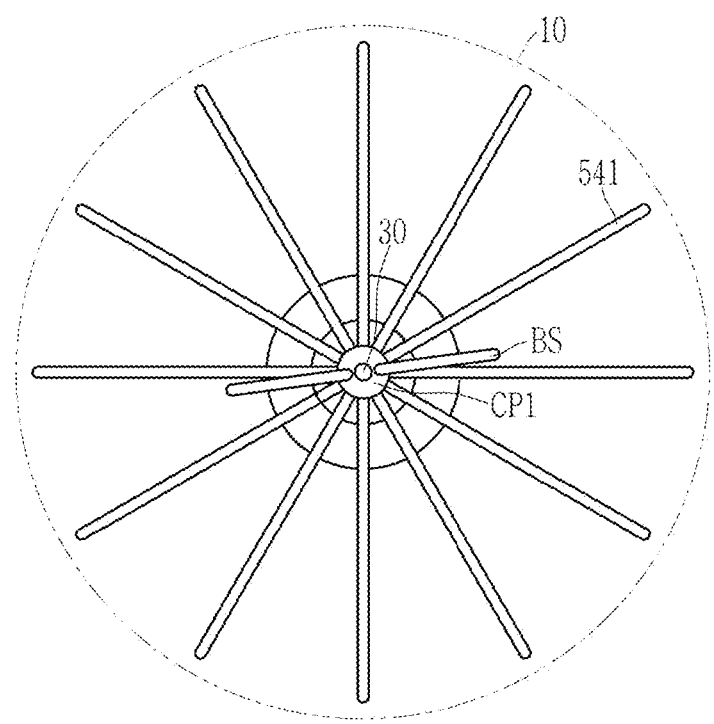
FIG. 11 is a side view showing connection relationship between an inflow passage and a diffusion passage when the pitch of the cooling passage among the cooling lines is 12, as a fourth Experimental Example according to according to a first embodiment.
Figure 12:
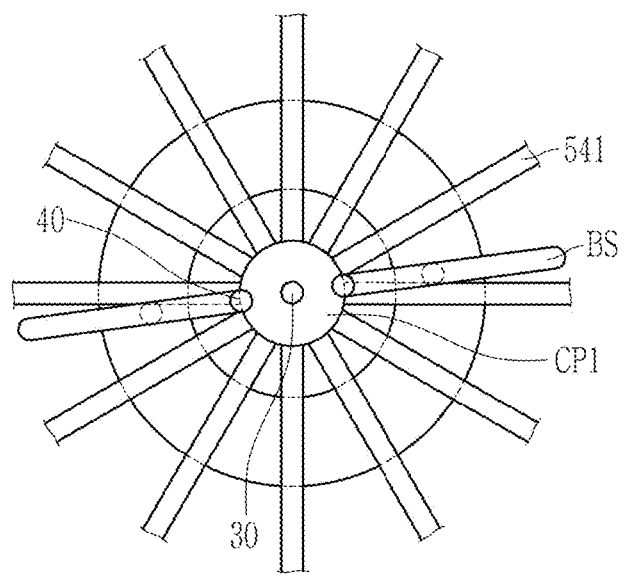
FIG. 12 is a partial enlarged view enlarging connection relationship between the inflow passage and the diffusion passage in FIG. 11.
Figure 13:
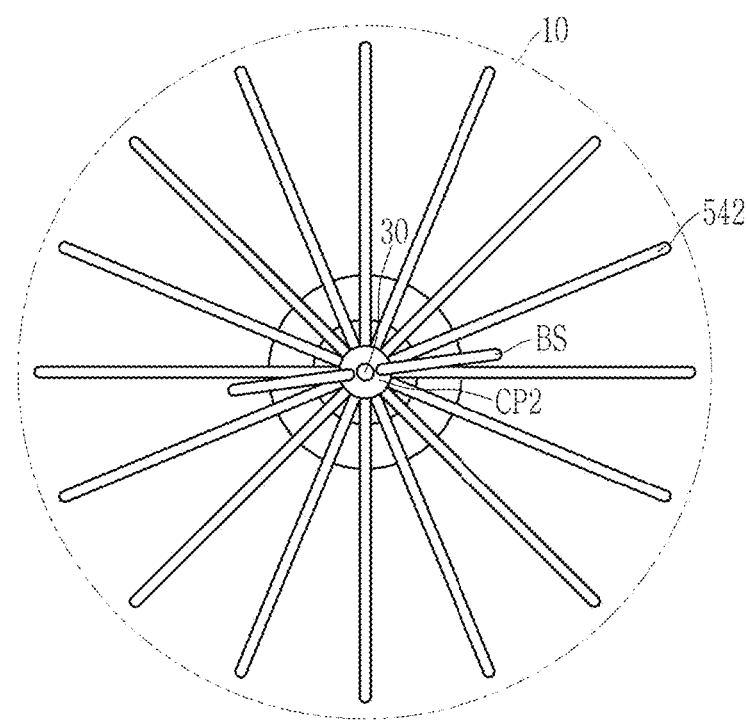
FIG. 13 is a side view showing connection relationship between an inflow passage and a diffusion passage when the pitch of the cooling passage among the cooling lines is 12, as a fifth Experimental Example according to according to a first embodiment.
Figure 14:
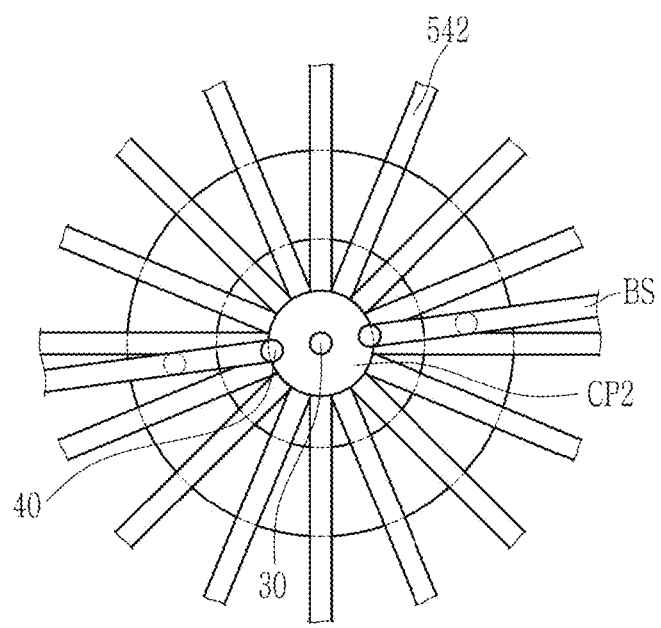
FIG. 14 is a partial enlarged view enlarging connection relationship between the inflow passage and the diffusion passage in FIG. 13.
Figure 15:
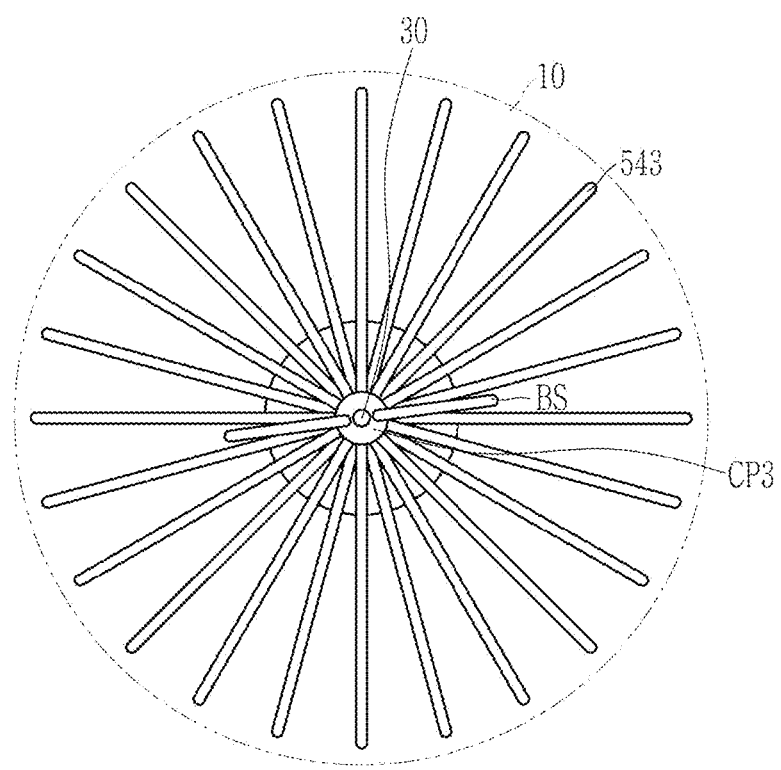
FIG. 15 is a side view showing connection relationship between an inflow passage and a diffusion passage when the pitch of the cooling passage among the cooling lines is 12, as a sixth Experimental Example according to according to a first embodiment.
Figure 16:
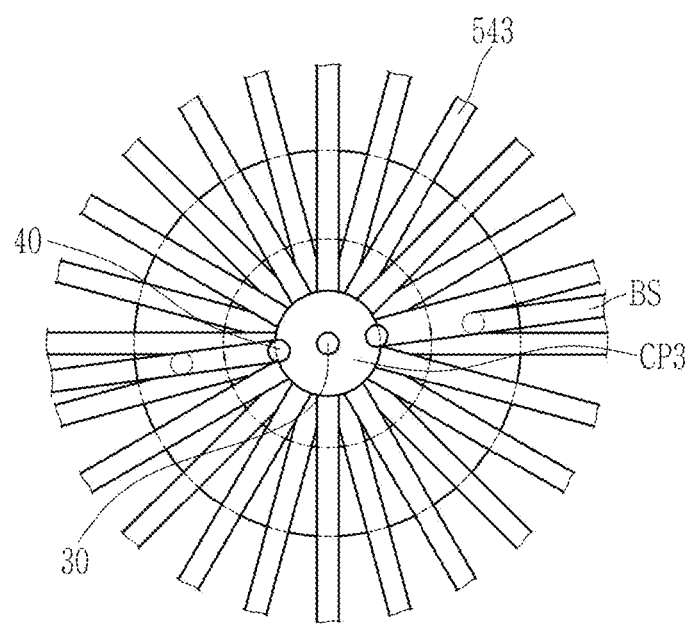
FIG. 16 is a partial enlarged view enlarging connection relationship between the inflow passage and the diffusion passage in FIG. 15.

FIG. 11 is a side view showing the connection between an inflow passage and a diffusion passage when the pitch of the cooling passage among the cooling lines is 12 mm, as a fourth Experimental Example according to according to the first embodiment. FIG. 12 is a partial enlarged view showing the connection between the inflow passage and the diffusion passage in FIG. 11. FIG. 13 is a side view showing the connection between an inflow passage and a diffusion passage when the pitch of the cooling passage among the cooling lines is 12 mm, as a fifth Experimental Example according to according to the first embodiment. FIG. 14 is a partial enlarged view showing the connection between the inflow passage and the diffusion passage in FIG. 13. FIG. 15 is a side view showing the connection between an inflow passage and a diffusion passage when the pitch of the cooling passage among the cooling lines is 12 mm, as a sixth Experimental Example according to according to the first embodiment. FIG. 16 is a partial enlarged view showing the connection between the inflow passage and the diffusion passage in FIG. 15.

Referring to FIG. 11 to FIG. 16, the fourth Experimental Example has twelve diffusion passages 541, the fifth Experimental Example has sixteen diffusion passages 542, and the sixth Experimental Example has twenty-four diffusion passages 543. In the fourth to the sixth Experimental Examples, the interior diameter of the fluid line is 5.0 mm to 10.0 mm, the cooling passages 55 are positioned on a circle having a diameter of 600 mm, and there are 6 to 16 diffusion passages 54 connected to the cooling passages 50. Thus, the pitch P is calculated as 600*3.14/(6 to 16). That is, the pitch P is 117.75 mm to 314 mm. As the number of diffusion passages 543 increases, the heat dissipation performance of the roller 10 improves. But in the sixth Experimental Example, interference occurs at a connection portion CP3. Accordingly, there are provided 6 to 16 diffusion passages 54. When the connection portion CP3 is excessively enlarged, the diffusion passage 543 may be excessively offset from the surface of the roller 10 in the length direction to the inner side in the length direction, causing the drawback of being heated before reaching the cooling passage 55.

Figure 17:
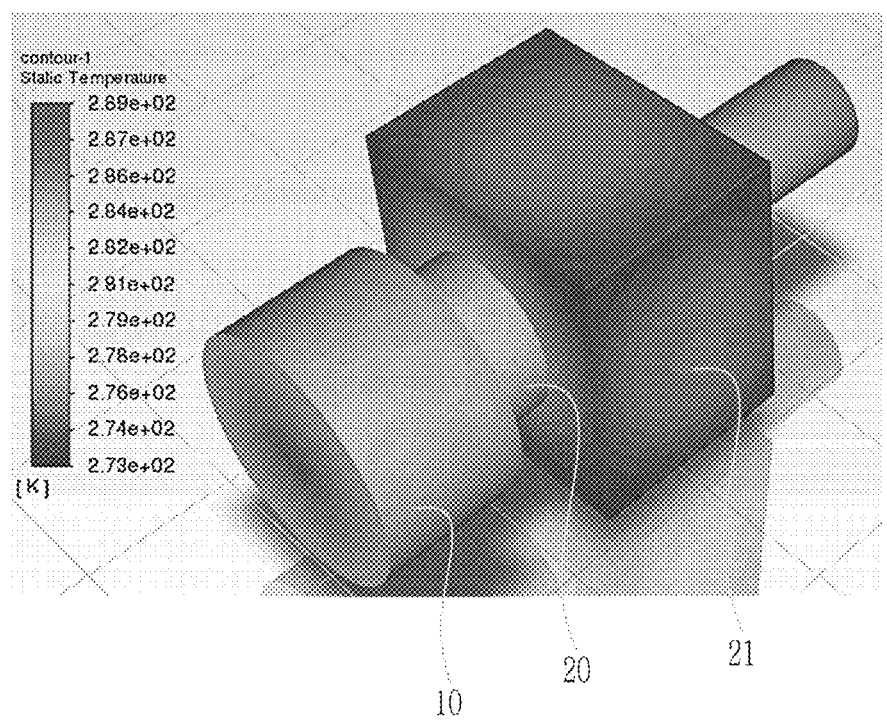
FIG. 17 is an image showing a thermal analysis result when a distance between the cooling passage and a surface of the roller is 25 mm, as a seventh Experimental Example according to according to a first embodiment.
Figure 18:
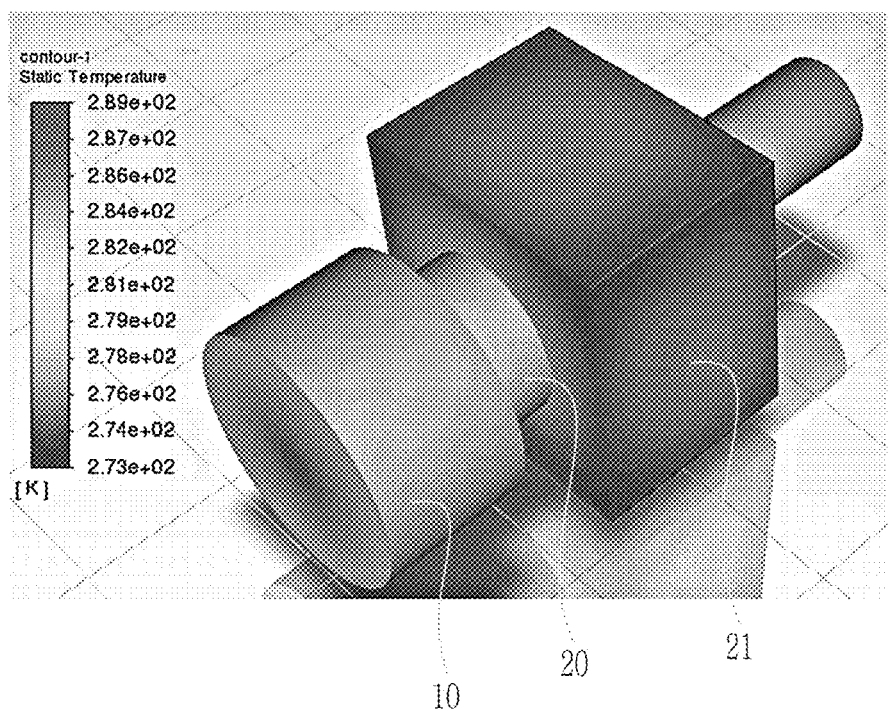
FIG. 18 is an image showing a thermal analysis result when the distance between the cooling passage and a surface of the roller is 50 mm, as an eighth Experimental Example according to according to a first embodiment.
Figure 19:
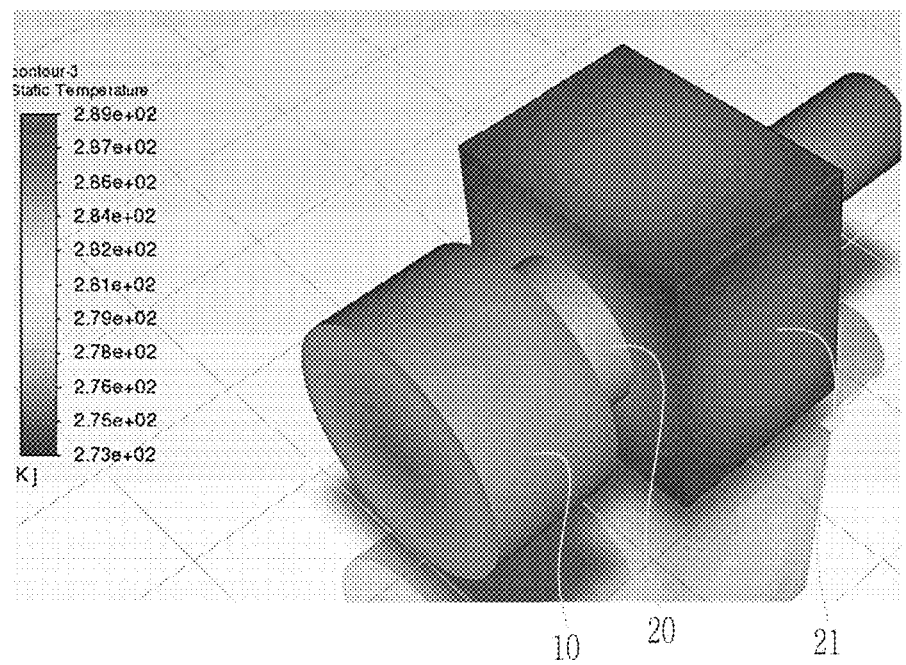
FIG. 19 is an image showing a thermal analysis result when a distance between the cooling passage and a surface of the roller is 75 mm, as a ninth Experimental Example according to according to a first embodiment.
Figure 20:
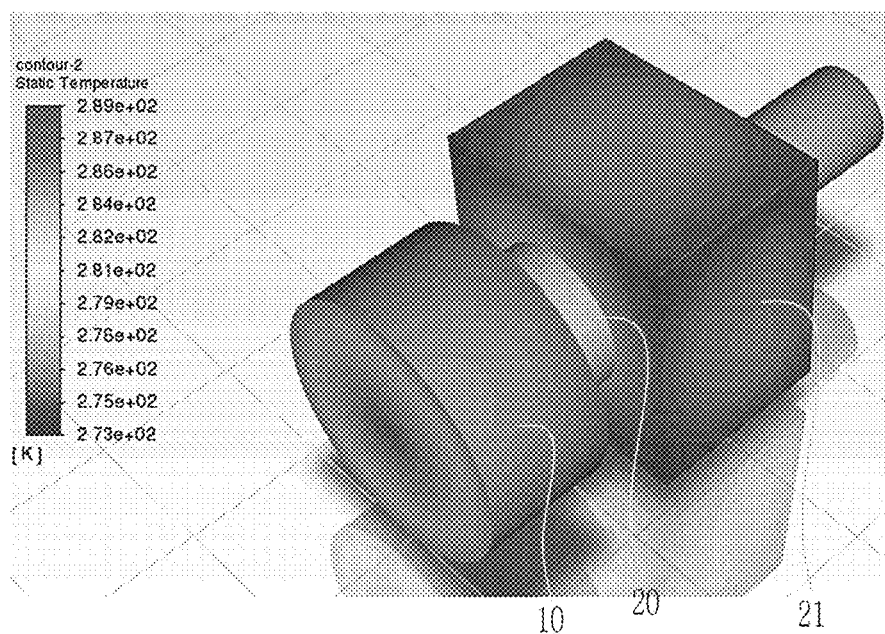
FIG. 20 is an image showing a thermal analysis result when the distance between the cooling passage and a surface of the roller is 100 mm, as a tenth Experimental Example according to according to a first embodiment.
Figure 21:
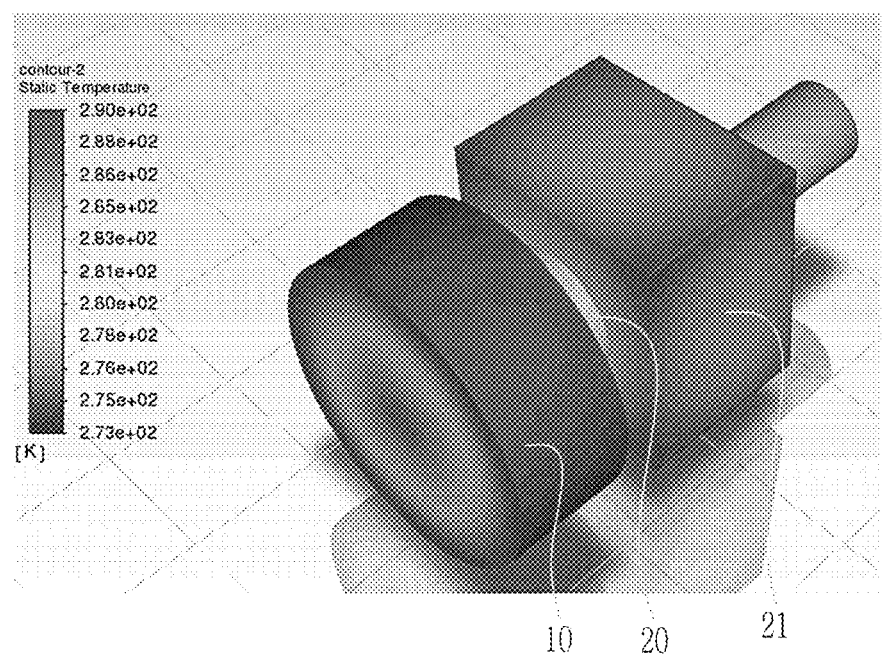
FIG. 21 is an image showing a thermal analysis result when the distance between the cooling passage and a surface of the roller is 200 mm, as an eleventh Experimental Example according to according to a first embodiment.

FIG. 17 is an image showing a thermal analysis result when a distance between the cooling passage and a surface of the roller is 25 mm, as a seventh Experimental Example according to according to the first embodiment. FIG. 18 is an image showing a thermal analysis result when the distance between the cooling passage and a surface of the roller is 50 mm, as an eighth Experimental Example according to according to the first embodiment. FIG. 19 is an image showing a thermal analysis result when a distance between the cooling passage and a surface of the roller is 75 mm, as a ninth Experimental Example according to according to the first embodiment. FIG. 20 is an image showing a thermal analysis result when the distance between the cooling passage and a surface of the roller is 100 mm, as a tenth Experimental Example according to according to the first embodiment. FIG. 21 is an image showing a thermal analysis result when the distance between the cooling passage and a surface of the roller is 200 mm, as an eleventh Experimental Example according to according to the first embodiment.

The interior diameter of the fluid line is 5.0 mm to 10.0 mm, the cooling passages 55 are positioned on a circle having a diameter of 600 mm, and there are 24 diffusion passages 54 connected to the cooling passages 50. Therefore, the pitch P is calculated as 600*3.14/24. Thus, the pitch P is 78.5 mm.

Referring to FIG. 17 to FIG. 21, regarding distances L1, L2, L3, L4, and L5 between the surface of the roller 10 and the cooling passages 55 of the cooling line 50, in the sixth Experimental Example the distance L1 is 25.0 mm, in the seventh Experimental Example the distance L2 is 50.0 mm, in the eighth Experimental Example the distance L3 is 75.0 mm, in the ninth Experimental Example the distance L4 is 100.0 mm, and in the tenth Experimental Example the distance L5 is 200.0 mm.

A surface temperature increase was not generated when the distances L1 to L3 are 25.0 mm to 75.0 mm, and the surface temperature increase was generated when the distance was 100.0 mm or greater as in L4 and L5. Accordingly, the 25.0 mm-75.0 mm distances L1 to L3 between the cooling passages 55 and the surface of the roller 10 were preferable.

Figure 22:
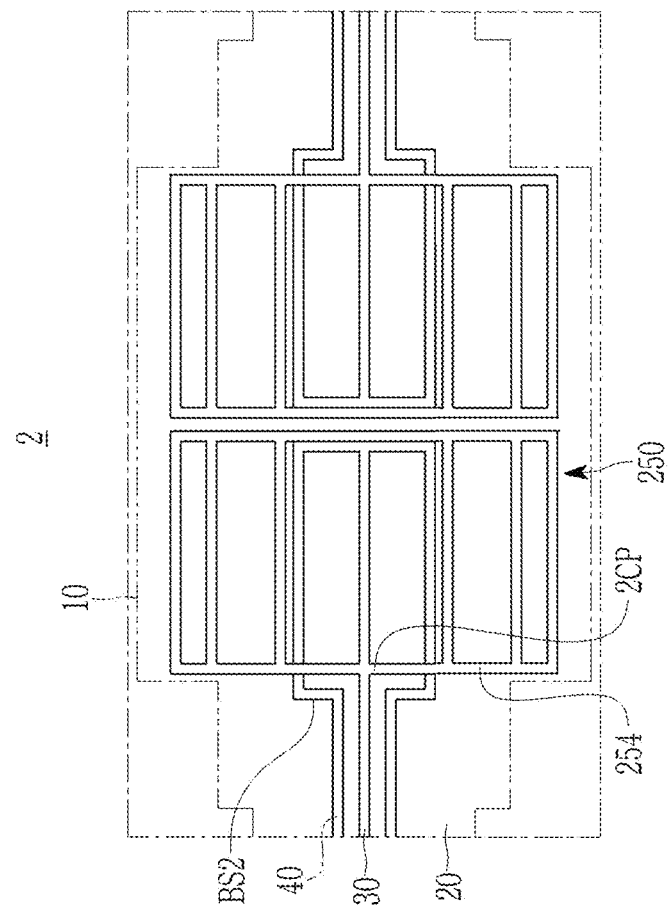
FIG. 22 is a drawing showing a roller and a shaft, and an arrangement of a cooling line, a supply line, and a discharge line formed therein of a roll pressing device for an electrode substrate according to a second embodiment of the present disclosure.

FIG. 22 is a drawing showing the roller and a shaft, and an arrangement of a cooling line, a supply line, and a discharge line formed therein of a roll pressing device 2 for an electrode substrate according to a second embodiment of the present disclosure. In a roll pressing device 2 for an electrode substrate of the second embodiment, a cooling line 250 is formed in the roller 10 and the shaft 20, and diffusion passages 254 are formed in a radial direction of the roller 10 and are connected to the supply line 30 at a connection portion 2CP.

The structure of the diffusion passages 254 provides are simple compared to the diffusion passages 54 having the inclined angle θ of the first embodiment. In addition, the discharge line 40 is split into two parts at the center of the roller 10 and is formed in the shaft 20 by the bent portion BS2 detouring around the connection portion 2CP of the supply line 30 and the diffusion passages 254.

Figure 23:
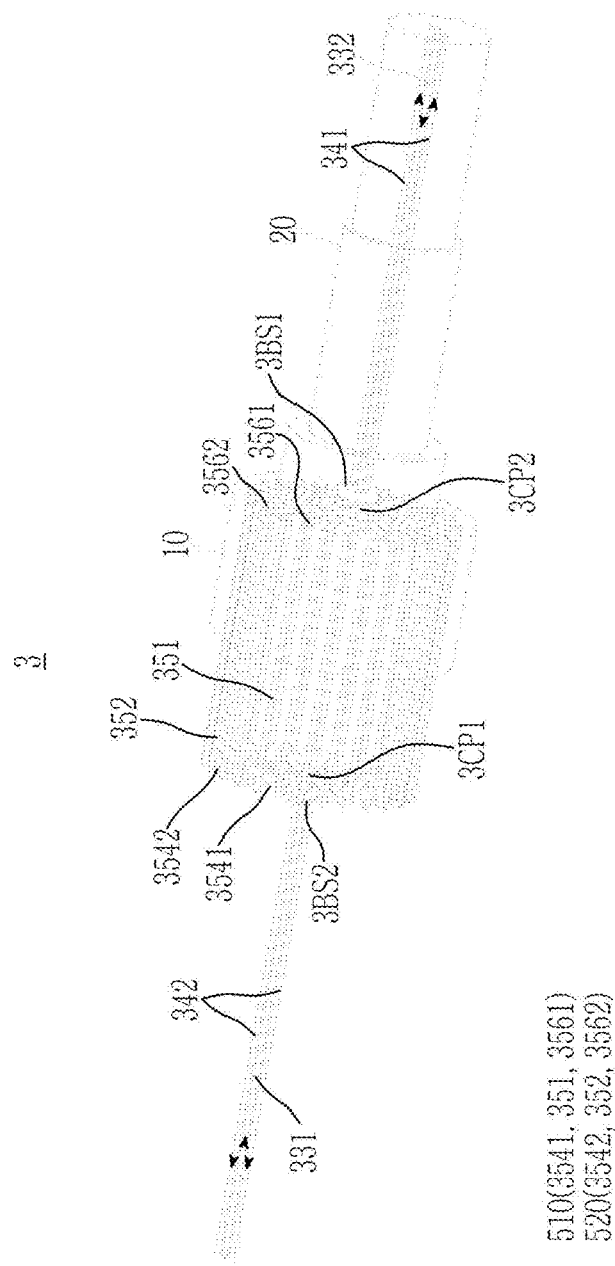
FIG. 23 is a drawing showing a roller and a shaft, and an arrangement of a cooling line, a supply line, and a discharge line formed therein of a roll pressing device for an electrode substrate according to a third embodiment of the present disclosure.
Figure 24:
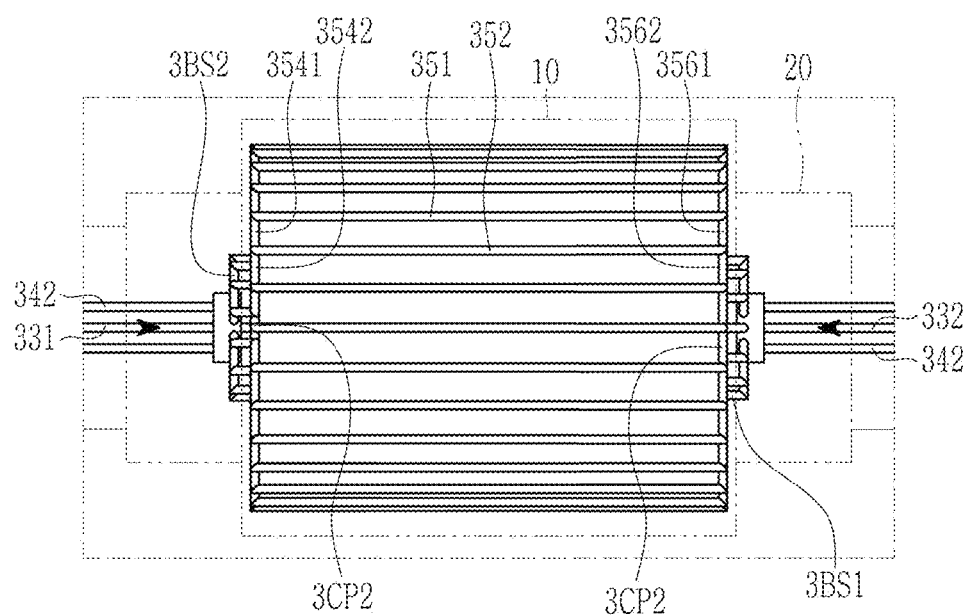
FIG. 24 is a partial top plan view showing an interior of FIG. 23.

FIG. 23 is a drawing showing the roller and a shaft, and an arrangement of a cooling line, a supply line, and a discharge line formed therein of a roll pressing device for an electrode substrate according to a third embodiment of the present disclosure. FIG. 24 is a partial top plan view showing an interior of the roll pressing device shown in FIG. 23.

Referring to FIG. 23 and FIG. 24, in a roll pressing device 3 for an electrode substrate 3 of the third embodiment, a pair of first and second cooling lines 510 and 520 are formed in the roller 10 and the shaft 20 and are alternately disposed along the circumferential direction of the roller 10. A first cooling line 510 is connected to a first supply line 331 and a first discharge line 341, and a second cooling line 520 is connected to a second supply line 332 and a second discharge line 342.

The first cooling line 510 includes first diffusion passages 3541, first cooling passages 351, and first convergence passages 3561. The first diffusion passages 3541 may be connected to the first cooling passages 351 in a radial structure at the outer end of the roller 10 (left end in FIGS. 23 and 24), and formed to be adjacent to the surface of the roller 10. The first cooling passages 351 may be adjacent to the surface of the roller 10 and connected to the first diffusion passages 3541, and the first cooling passages 351 may be parallel to each other and formed to a second outer end of the roller 10 (right end in FIGS. 23 and 24). The first convergence passages 3561 may be connected to the first cooling passages 351 in a radial structure at the second outer end of the roller 10, and the second cooling passages 3561 may be formed to be adjacent to the center of the roller 10 and connected to the first discharge line 341.

The first supply line 331 is connected to the first cooling passages 351 through a first connection portion 3CP1 and the first diffusion passage 3541 at the left side, and the first discharge line 341 is connected to the first cooling passages 351 through the first convergence passage 3561 at the right side.

The second cooling line 520 includes second diffusion passages 3542, second cooling passages 352, and second convergence passages 3562. The second diffusion passages 3542 may be connected to the second cooling passages 352 in a radial structure at the second outer end of the roller 10 (right end in FIGS. 23 and 24), and formed to be adjacent to the surface of the roller 10. The second cooling passages 352 may be adjacent to the surface of the roller 10 and connected to the second diffusion passages 3542, and the second cooling passages 352 may be parallel to each other and formed to the outer end of the roller 10 (left end in FIG. 23 and FIG. 24). The second convergence passages 3562 may be connected to the second cooling passages 352 in a radial structure at the outer end of the roller 10, and the second convergence passages 3562 may be formed to be adjacent to the center of the roller 10 and connected to the second discharge line 342.

The second supply line 332 is connected to the second cooling passages 352 through a second connection portion 3CP2 and the second diffusion passage 3542 at the right side, and the second discharge line 342 is connected to the second cooling passages 352 through the second convergence passage 3562 at the left side.

At this time, the first discharge line 341 is formed in the shaft 20 by a bent portion 3BS1 detouring around the second connection portion 3CP2 of the second convergence passages 3562. The second discharge line 342 is formed in the shaft 20 by a bent portion 3BS2 detouring around the first connection portion 3CP1 of the first convergence passages 3561. Therefore, along the length direction and the circumferential direction of the roller 10, the non-uniformity due to thermal gradients on the surface of the roller 10 may be prevented by the first and second cooling lines 510 and 520. Since the non-uniform expansion of the surface of the roller 10 is prevented, the capacity density of the electrode substrate that is roll-pressed may be uniform.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS 1, 2, 3: roll pressing device for electrode substrate
10: the roller
20: shaft
21: the bearing
30: supply line
40: discharge line
50, 250: cooling line
51, 510: first cooling line
52, 520: second cooling line
54: diffusion passage
55: cooling passage
56: convergence passage
331: first supply line
332: second supply line
341: first discharge line
342: second discharge line
351, 352: first, second cooling passage
541, 542, 543: diffusion passage
3541: first diffusion passage
3542: second diffusion passage
3561: first convergence passage
3562: second convergence passage
BS, BS2, 3 BS1, 3BS2: bent portion
CP, CP3, 2CP: connection portion
3CP1: first connection portion
3CP2: second connection portion
L, L1, L2, L3, L4, L5: distance between flows
P: pitch
TL: total length
θ: angle
φ1, φ2, φ3: diameter

What is claimed is:

1. A roll pressing device comprising:
    a roller configured to apply pressure to a substrate provided with an active material, the roller being provided with a pair of cooling lines through which a coolant passes;
    a shaft configured to drive the roller;
    a pair of supply lines provided on opposite sides of the roller based on a center of the roller in a length direction of the roller, the pair of supply lines being configured to supply the coolant to the pair of cooling lines; and
    a pair of discharge lines provided on the opposite sides of the roller and configured to discharge the coolant that has cooled the roller from the pair of cooling lines,
    wherein the pair of cooling lines are separated from each other,
    wherein each of the cooling lines comprises:
        a plurality of diffusion passages connected to one of the supply lines at an outer end of the roller, each of the diffusion passages radially extending from the supply line toward a surface of the roller;
        a plurality of cooling passages connected to the plurality of diffusion passages at a roller surface side, each of the cooling passages extending toward the center of the roller in the length direction; and
        a plurality of convergence passages connected to the plurality of cooling passages at a center of the roller in the length direction side, each of the convergence passages radially extending toward a center of the roller in a radial direction and connected to one of the discharge lines,
    wherein the plurality of cooling passages are spaced apart from each other to have a pitch along a circumferential direction of the roller, and each of the cooling passages has a separation distance from a surface of the roller in the radial direction, and
    wherein each of the discharge lines is positioned in the roller, spaced from the center of the roller in the radial direction toward an outer side of the roller, connected to convergence passages of the plurality of convergence passages, and extends to pass between passages of the plurality of diffusion passages, is spaced from an outer side of the supply line in the radial direction, and extends along a length direction of the shaft.

2. The roll pressing device of claim 1, wherein the plurality of diffusion passages have a slope at an angle θ relative to a radius of the roller that is perpendicular to the length direction.

3. The roll pressing device of claim 1, wherein each of the cooling lines comprises a diameter of 5 mm to 10 mm.

4. The roll pressing device of claim 1, wherein the number of the plurality of diffusion passages is 6 to 16.

5. The roll pressing device of claim 1, wherein the plurality of diffusion passages extends from the center of the roller in the radial direction to an outer part of the roller.

6. The roll pressing device of claim 1, wherein a distance between the cooling passage and a surface of the roller is 25 to 75 mm.

7. The roll pressing device of claim 6, wherein each of the discharge lines comprises a bent portion split into plural parts at the center of the roller in the radial direction, and the bent portion extends around a connection portion between one of the supply lines and diffusion passages of the plurality of diffusion passages.

8. A roll pressing device comprising:
    a roller configured to apply pressure to a substrate provided with an active material, the roller being provided with a pair of cooling lines through which a coolant passes;
    a shaft configured to drive the roller;
    a pair of supply lines provided on opposite sides of the roller and configured to supply the coolant to the pair of cooling lines; and
    a pair of discharge lines provided on the opposite sides of the roller and configured to discharge the coolant that has cooled the roller from the pair of cooling lines,
    wherein the pair of cooling lines are separated from each other,
    wherein the pair of cooling lines comprises a first cooling line and a second cooling line alternately disposed along a circumferential direction of the roller,
    wherein the first cooling line comprises:
        a plurality of first diffusion passages connected to a first supply line of the plurality of supply lines at a first outer end of the roller, the plurality of first diffusion passages extending in a radial direction of the roller from the first supply line toward a surface of the roller;
        a plurality of first cooling passages connected to the plurality of first diffusion passages at a surface side of the roller, the plurality of first cooling passages extending to a second outer end of the roller; and
        a plurality of first convergence passages connected to the plurality of first cooling passages at the second outer end of the roller, the plurality of first convergence passages extending toward a center of the roller in the radial direction and connected to a first discharge line of the plurality of discharge lines, and
    wherein the second cooling line comprises:
        a plurality of second diffusion passages connected to a second supply line of the plurality of supply lines at the second outer end of the roller, the plurality of second diffusion passages extending in the radial direction toward the surface of the roller;
        a plurality of second cooling passages connected to the plurality of second diffusion passages at the surface side, the plurality of second cooling passages extending to the first outer end of the roller; and
        a plurality of second convergence passages connected to the plurality of second cooling passages at the first outer end of the roller, the plurality of second convergence passages extending toward the center of the roller in the radial direction and connected to a second discharge line of the plurality of discharge lines.

9. The roll pressing device of claim 8, wherein the first discharge line is formed in the shaft as a bent portion that detours around a second connection portion of second convergence passages, and the second discharge line is formed in the shaft as a bent portion that detours around a first connection portion of the first convergence passages.

* * * * *